United States Patent
Kruempelmann et al.

(10) Patent No.: US 11,966,390 B2
(45) Date of Patent: Apr. 23, 2024

(54) VIRTUALIZATION OF CONFIGURATION DATA

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

( * ) Notice: Subject to any disclaimer, the term of this patent is extended or adjusted under 35 U.S.C. 154(b) by 334 days.

(21) Appl. No.: 16/690,088

(22) Filed: Nov. 20, 2019

(65) Prior Publication Data

US 2021/0149894 A1    May 20, 2021

(51) Int. Cl.
    G06F 16/242    (2019.01)
    G06F 16/21     (2019.01)
    G06F 16/22     (2019.01)
    G06F 16/23     (2019.01)

(52) U.S. Cl.
    CPC ........ *G06F 16/2443* (2019.01); *G06F 16/213* (2019.01); *G06F 16/2282* (2019.01); *G06F 16/2393* (2019.01)

(58) Field of Classification Search
    CPC ............. G06F 16/2443; G06F 16/2282; G06F 16/213; G06F 16/2393
    See application file for complete search history.

(56) References Cited

U.S. PATENT DOCUMENTS

| | | | | |
|---|---|---|---|---|
| 2003/0212705 A1* | 11/2003 | Williamson | ........ | G06F 16/2438 |
| 2014/0012922 A1* | 1/2014 | Wu | ........ | G06F 16/972 |
| | | | | 709/205 |
| 2014/0013247 A1* | 1/2014 | Beechuk | ........ | G06Q 10/101 |
| | | | | 715/753 |
| 2014/0040182 A1* | 2/2014 | Gilder | ........ | G06F 16/256 |
| | | | | 707/602 |
| 2014/0046638 A1* | 2/2014 | Peloski | ........ | G06F 16/2246 |
| | | | | 703/6 |
| 2016/0364445 A1* | 12/2016 | Golec | ........ | G06Q 10/10 |

* cited by examiner

*Primary Examiner* — Amy Ng
*Assistant Examiner* — Courtney Harmon
(74) *Attorney, Agent, or Firm* — Mintz Levin Cohn Ferris Glovsky and Popeo, P.C.

(57) ABSTRACT

A method may include receiving a selection of a template defining a manner in which data is stored in one or more database tables operated upon by a software application while the software application performs a function. The selected template may be stored in a first database table. Customizations applied to the selected template are stored in a second database table. In response to the software application performing the function, a virtual customizing table may be generated to include a database view having the selected template from the first database table and the customizations from the second database table. The software application may perform the function based on the virtual customization table, which is not persisted at a database but is generated as needed. Related systems and articles of manufacture, including computer program products, are also provided.

14 Claims, 4 Drawing Sheets

VIRTUALIZATION OF CONFIGURATION DATA

TECHNICAL FIELD

The present disclosure generally relates to cloud-computing and, more specifically, to the virtualization of configuration data.

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

Methods, systems, and articles of manufacture, including computer program products, are provided for virtualizing configuration data. In one aspect, there is provided a system including at least one processor and at least one memory. The at least one memory can store instructions that cause operations when executed by the at least one processor. The operations may include: receiving a selection of a template from a plurality of templates, each of the plurality of templates defining a manner in which data is stored in one or more database tables operated upon by a software application while the software application performs one or more functions of the software application, and the plurality of templates stored in a first database table; receiving one or more customizations that are applied to the selected template in order to change the manner in which data is stored in the one or more database tables operated upon by the software application, the one or more customizations stored in a second database table; and generating, in response to the software application performing the one or more functions, a virtual customizing table, the virtual customizing table generated to include a database view on the first database table and the second database table, the database view including the selected template and the one or more customizations, and the one or more functions of the software application performed based at least on the virtual customization table.

In some variations, one or more of the features disclosed herein including the following features can optionally be included in any feasible combination. The virtual customizing table may be generated by invoking a stored procedure configured to generate the database view. The stored procedure may include a set of Structured Query Language (SQL) statements for accessing a database storing the first database table and the second database table. The stored procedure may be stored at the database storing the first database table and the second database table.

In some variations, applying the one or more customizations to the software application may add, remove, and/or modify the one or more functions of the software application.

In some variations, the virtual customizing table may be generated without persisting the virtual customizing table at a database.

In some variations, the first database table may be modified in response to a change in the selected template. The virtual customization table may be updated to include another database view of the modified first database table and the second database table. The other database view may include the change to the selected template and the one or more customizations. The software application may perform the one or more functions based on the updated virtual customization table.

In some variations, each of the plurality of templates may specify one or more columns included in each of the one or more database tables operated upon by the software application.

In some variations, the software application may be an enterprise resource planning (ERP) software application, a customer relationship management (CRM) software application, and/or a supply chain management (SCM) software application.

In some variations, the one or more functions may include invoicing, procurement, payroll, time and attendance management, recruiting and onboarding, learning and development, performance and compensation, and/or workforce planning.

In another aspect, there is provided a method for virtualizing synchronization data. The method may include: receiving a selection of a template from a plurality of templates, each of the plurality of templates defining a manner in which data is stored in one or more database tables operated upon by a software application while the software application performs one or more functions of the software application, and the plurality of templates stored in a first database table; receiving one or more customizations that are applied to the selected template in order to change the manner in which data is stored in the one or more database tables operated upon by the software application, the one or more customizations stored in a second database table; and generating, in response to the software application performing the one or more functions, a virtual customizing table, the virtual customizing table generated to include a database view on the first database table and the second database table, the database view including the selected template and the one or more customizations, and the one or more functions of the software application performed based at least on the virtual customization table.

In some variations, one or more of the features disclosed herein including the following features can optionally be included in any feasible combination. The virtual customizing table may be generated by invoking a stored procedure configured to generate the database view. The stored procedure may include a set of Structured Query Language (SQL) statements for accessing a database storing the first database table and the second database table. The stored procedure may be stored at the database storing the first database table and the second database table.

In some variations, applying the one or more customizations to the software application may add, remove, and/or modify the one or more functions of the software application.

In some variations, the virtual customizing table may be generated without persisting the virtual customizing table at a database.

In some variations, the method may further include: modifying the first database table in response to a change to the selected template; and updating the virtual customization table to include another database view of the modified first database table and the second database table, the other database view including the change to the selected template and the one or more customizations, and the software application performing the one or more functions based on the updated virtual customization table.

In some variations, each of the plurality of templates may specify one or more columns included in each of the one or more database tables operated upon by the software application.

In some variations, the software application may be an enterprise resource planning (ERP) software application, a customer relationship management (CRM) software application, and/or a supply chain management (SCM) software application.

In some variations, the one or more functions may include invoicing, procurement, payroll, time and attendance management, recruiting and onboarding, learning and development, performance and compensation, and/or workforce planning.

In another aspect, there is provided a computer program product that includes a non-transitory computer readable medium. The non-transitory computer readable medium may store instructions that cause operations when executed by at least one data processor. The operations may include: receiving a selection of a template from a plurality of templates, each of the plurality of templates defining a manner in which data is stored in one or more database tables operated upon by a software application while the software application performs one or more functions of the software application, and the plurality of templates stored in a first database table; receiving one or more customizations that are applied to the selected template in order to change the manner in which data is stored in the one or more database tables operated upon by the software application, the one or more customizations stored in a second database table; and generating, in response to the software application performing the one or more functions, a virtual customizing table, the virtual customizing table generated to include a database view on the first database table and the second database table, the database view including the selected template and the one or more customizations, and the one or more functions of the software application performed based at least on the virtual customization table.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the virtualization of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
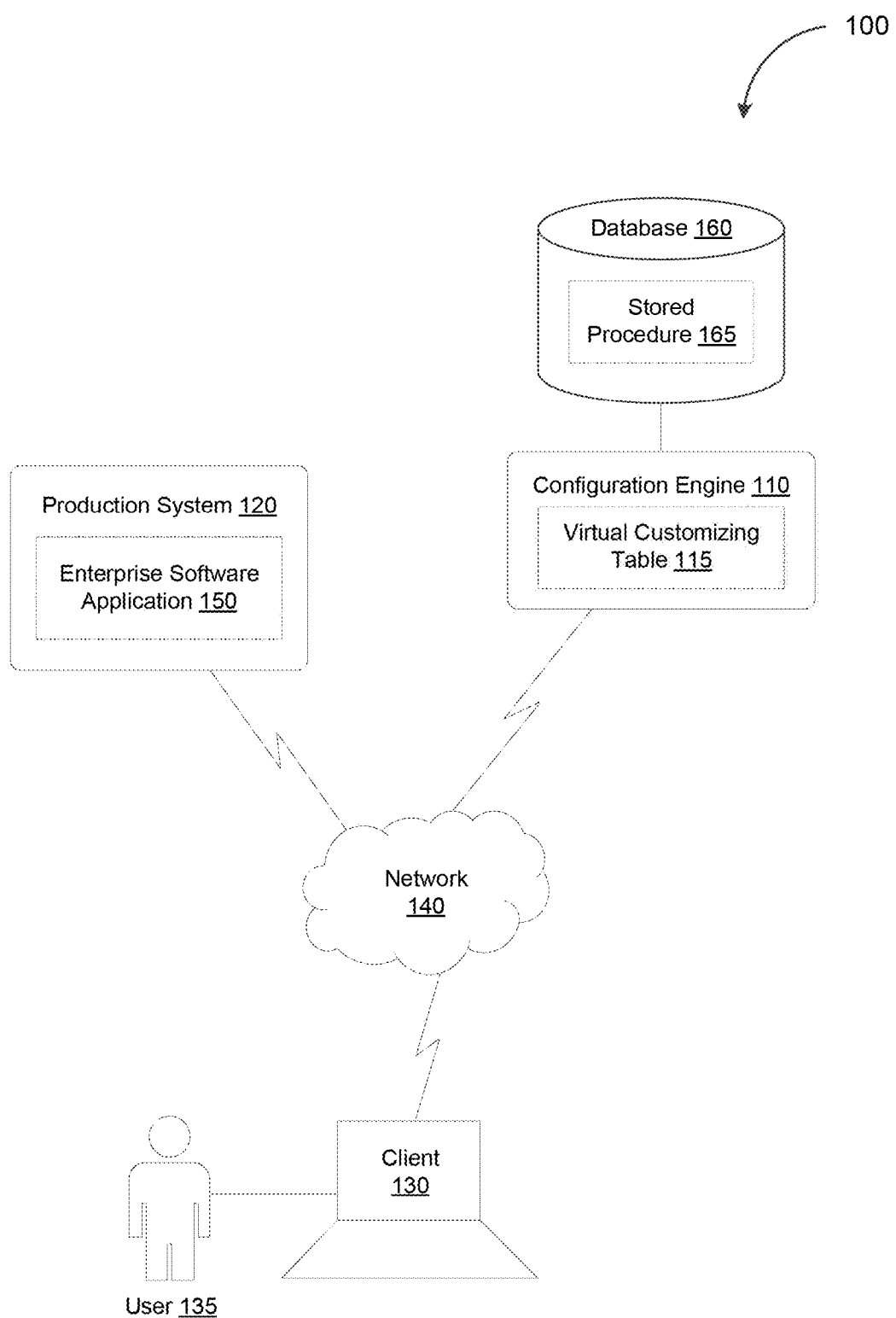
FIG. 1 depicts a system diagram illustrating a configuration system, in accordance with some example embodiments.

When practical, like labels are used to refer to same or similar items in the drawings.

DETAILED DESCRIPTION

An enterprise software application may operate on data stored in one or more database tables. As such, the enterprise software application may be implemented based on a template defining the manner in which data is stored in the database tables. For example, the template may specify the columns that form the entries occupying the rows in each one of the database tables. The enterprise software application may be delivered to different end users with a template library including a set of templates. Each end user may subsequently select, based on individual requirements, one or more of the templates from the template library. For instance, one end user may select, as part of the scoping the enterprise software application, a template specific to the end user's industry and/or application. That end user may further customize the enterprise software application by applying, to the selected template, one or more end user specific customizations prior to deploying the customized enterprise software application to that end user's production system. Accordingly, each deployment of the enterprise software application may be customized to operate on database tables storing data in an end user specific manner.

Configuration data capturing the end user's customizations to the enterprise software application may be stored in one or more customizing tables. Accordingly, deploying a customized template to an end user's production system may include generating one or more customizing tables that store the end user's customized templates. However, the templates associated with the enterprise software application may undergo frequent changes due to, for example, updates to the enterprise software application, optimization of the enterprise processes implemented by the enterprise software application, and/or the like. Any changes made to the underlying template subsequent to the generation of customizing tables may require complex recalculations to regenerate the customizing tables storing the end user's customized templates.

As such, in some example embodiments, a configuration engine may deploy an end user's customized template by at least generating a virtual customizing table that includes the end user's customized templates. Generating a virtual customizing table, which is not persisted like a conventional customizing table, may avoid the overhead associated with regenerating customizing tables in response to changes to the underlying template. The virtual customizing table may be generated by invoking a stored procedure configured to generate the virtual customizing table by at least creating a database view that includes data from one or more database tables. For example, invoking the stored procedure may create a database view that includes data from a template table including the templates associated with the enterprise software application and a scoping table including the end user's customizations and. Instead of relying on a conventional customizing table persisted at a database, the enterprise software application may operate based on the virtual customizing table, which may be generated as needed by invoking the stored procedure.

FIG. 1 depicts a system diagram illustrating a configuration system 100, in accordance with some example embodiments. Referring to FIG. 1, the configuration system 100 may include a configuration engine 110, a production system 120, and a client 130. As shown in FIG. 1, the configuration engine 110, the production system 120, and the client 130 may be communicatively coupled via a network 140. The network 140 may be a wired and/or wireless network including, for example, a wide area network (WAN), local area network (LAN), a virtual local area network (VLAN), the Internet, and/or the like. Moreover, the production system 120 may be a cloud-based system hosted on a cloud-computing platform.

Referring again to FIG. 1, the production system 120 may host an enterprise software application 150. Examples of the enterprise software application 150 may include an enterprise resource planning (ERP) software application, a customer relationship management (CRM) software application, a supply chain management (SCM) software application, and/or the like. Accordingly, the enterprise software application 150 may perform a variety of functions including, for example, procurement, invoicing, payroll, time and attendance management, recruiting and onboarding, learning and development, performance and compensation, workforce planning, and/or the like.

A user 135 at the client 130 may develop one or more customizations for the enterprise software application 150 as part of scoping the enterprise software application 150. For example, the user 135 at the client 130 may scope the enterprise software application 150 by selecting a template defining the manner in which data is stored in one or more database tables that are operated upon by the enterprise software application 150 while performing one or more functions of the enterprise software application 150. The template may be selected based on one or more criteria including, for example, the industry and/or the application associated with the user 135 at the client 130. The user 135 at the client 130 may further scope the enterprise software application 150 by applying, to the selected template, one or more customizations to change the one or more database tables including the manner in which data is stored in the one or more database tables. In doing so, the user 135 at the client 130 may develop customizations that add, remove, and/or modify one or more functions of the enterprise software application 150.

In some example embodiments, the customizations developed by the user 135 at the client 130 may be deployed by the configuration engine 110 invoking a stored procedure 165 at a database 160 coupled with the configuration engine 110. The stored procedure 165 may be a subroutine including a set of Structure Query Language (SQL) statements for accessing the database 160. Moreover, the stored procedure 165 may be configured to generate a virtual customizing table 115 that includes the customizations to the enterprise software application 150. The virtual customizing table 115 may be generated as needed by invoking the stored procedure 165 instead of being persisted at the database 160. For example, the configuration engine 110 may generate the virtual customizing table 115 when deploying a customized template to the production system 120. Accordingly, instead of relying on a conventional customizing table persisted at the database 160, the enterprise software application 150 may operate based on the virtual customizing table 115, which may be generated as needed by the configuration engine 110 invoking the stored procedure 165. For example, one or more functions of the enterprise software application 150 may be performed based on the virtual customizing table 115, which may be generated in response to the enterprise software application performing the one or more functions.

In some example embodiments, the stored procedure 165 may be configured to generate the virtual customizing table 115 by creating a database view with data from multiple database tables stored in the database 160 including, for example, a template table including the templates associated with the enterprise software application 150 and a scoping table including the customizations applied to the enterprise software application 150. Table 1 below depicts an example of programming code implementing the stored procedure 165. As shown in Table 1 below, the stored procedure 165 may generate the virtual customizing table 115 by creating a database view that includes data selected from multiple database tables.

TABLE 1

```
CREATE PROCEDURE ProcWithResultView(IN
id INT, OUT ol content_View)
    LANGUAGE SQLSCRIPT
    READS SQL DATA WITH RESULT VIEW
    record_view AS
    BEGIN
Select Record entity, from :Cust_view into
rec_entity where table = :record_table and
field_content = : field and field_name = : field_name.
< This selects the record entity (the selected row)
from the given single field and single field
content>
Select Field_content, record_field from
:Cust_view into:record_view-record_field where table =
:record_table and record_entity = rec_entity.
<This uses the selected record entitiy to select all
fields and puts all fields into view-row>
Endselect.
END;
```

Figure 2:
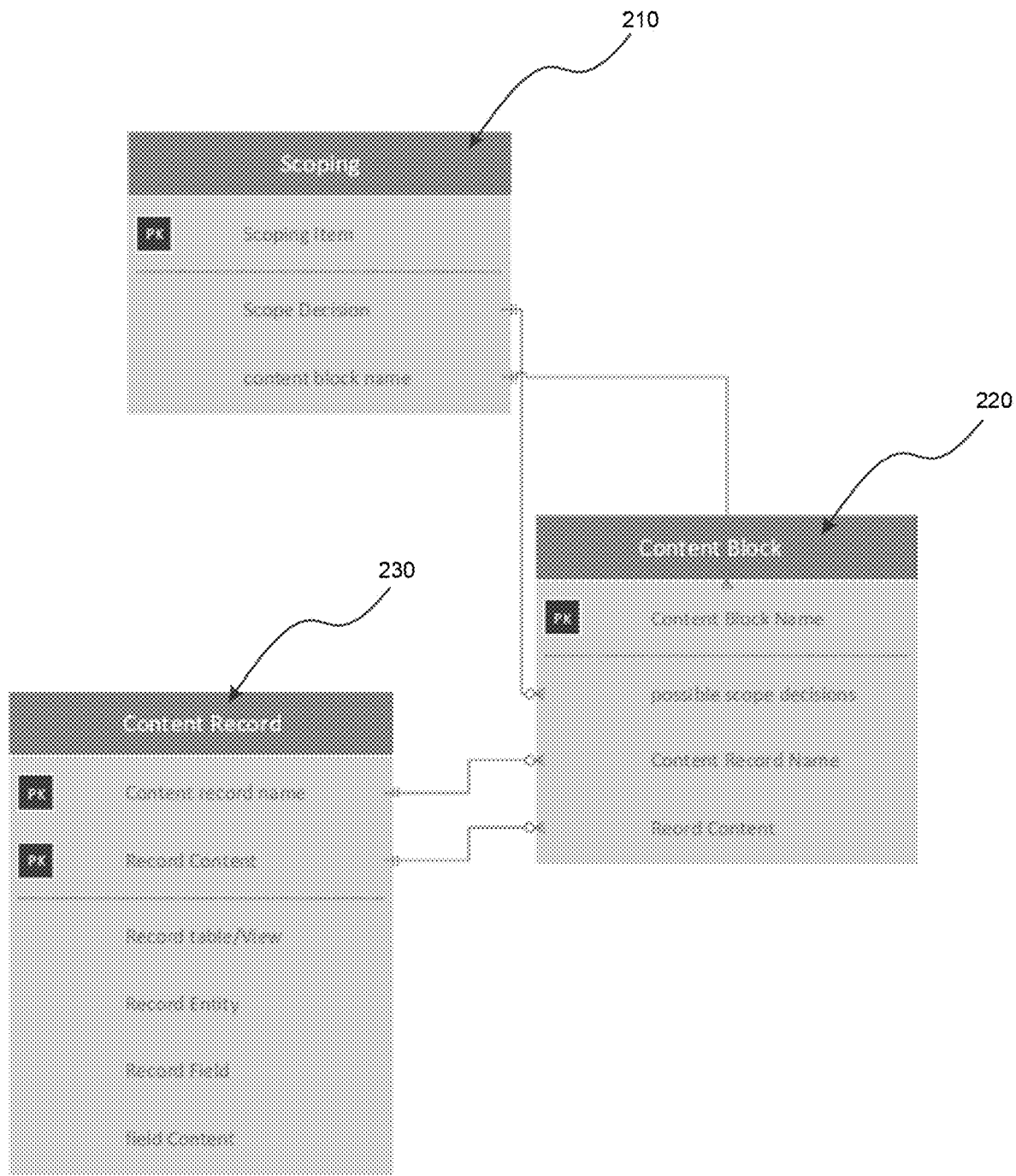
FIG. 2 depicts examples of database tables for generating a database view that forms a virtual customizing table, in accordance with some example embodiments.

FIG. 2 depicts examples of database tables for generating a database view that forms the virtual customizing table 115, in accordance with some example embodiments. Referring to FIGS. 1-2, the configuration engine 110 may invoke the stored procedure 165 in order to generate the virtual customizing table 115. When invoked, the stored procedure 165 may generate the virtual customizing table 115 by generate a database view that includes data from at least a first database table 210, a second database table 220, and a third database table 230. The first database table 210, the second database table 220, and the third database table 230 may be stored at the database 160. In some example embodiments, instead of persisting the virtual customizing table 115 at the database 160, the virtual customizing table 115 is generated as needed by the configuration engine 110 invoking the stored procedure 165 to generate the database view that includes data from the first database table 210, the second database table 220, and the third database table 230.

Referring to FIG. 2, the first database table 210 may be a scoping table that includes the customizations applied to the enterprise software application 150, for example, by the user 135 at the client 130. In the example shown in FIG. 2, the first database table 210 (e.g., the scoping table) may include one or more fields for scoping items, scope decisions, content block names, and/or the like. As noted, these customizations may be applied to a template associated with the enterprise software application 150, which may define the manner in which data is stored in the one or more database tables that are operated upon by the enterprise software application 150 while performing one or more functions of the enterprise software application 150. These customizations may change the one or more database tables including the manner in which data is stored in the one or more database tables. As such, it should be appreciated that the first database table 210 may include customizations that add, remove, and/or modify one or more functions of the enterprise software application 150.

Referring again to FIG. 2, each of the second database table 220 and the third database table 230 may be a template table storing the templates associated with the enterprise software application 150. In the example shown in FIG. 2, the second database table 220 may include one or more fields for block names, scope decisions, content record names, record contents, and/or the like. Meanwhile, the third database table 230 may include one or more fields for content record names, record tables or views, record entities, record contents, fields, field contents, and/or the like. For example, the first database table 210 may store an industry type (e.g., automobile manufacturing, pharmaceutical, and/or the like) while the second database table 220 and/or the third database table 230 may store correlations between the industry type and the manufacturing type (e.g., one or more makes of automobiles, pharmaceutical compounds, and/or the like).

As noted, the enterprise software application 150 may be associated with multiple templates, each of which define the manner in which data is stored in the one or more database tables that are operated upon by the enterprise software application 150 while performing one or more functions of the enterprise software application 150. While scoping the enterprise software application 150, the user 135 at the client 130 may select one or more of the templates from the second database table 220 and/or the third database table 230. The selected templates may each define the manner in which data is stored in the one or more database tables that are operated upon by the enterprise software application 150 while performing one or more functions of the enterprise software application 150. The user 135 at the client 130 may therefore further scope the enterprise software application 150 by at least applying, to the selected templates, one or more customizations to change the manner in which data is stored in the these database tables.

In some example embodiments, the virtual customizing table 115 may be generated by invoking the stored procedure 165. When invoked, the stored procedure 165 may generate the virtual customizing table 115 by at least generating a database view that includes data from the first database table 210, the second database table 220, and the third database table 230. For example, the stored procedure 165 may generate the virtual customizing table 115 by performing an inner join that joins together the first database table 210, the second database table 220, and the third database table 230 based on the content block name field, the scope decision field, the content record name field, and the record content field. The resulting virtual customizing table 115 may include fields for scoping item, scope decision, content block name, content record name, record content, record table or view, record entity, field, and field content.

To support multiple projects in which the user 135 at the client 130 develops different customizations for the enterprise software application 150, an additional database table at the database 160 may store a project identifier (e.g., a project name, a project number, and/or the like) for each set of customizations developed by the user 135 at the client 135. Accordingly, the customizing table 115 may be further generated for a specific project including a specific set of customizations developed by the user 135 at the client 130 by invoking the stored procedure 165 to generate, based on this additional database table, a database view that includes the data from the scoping table and template tables associated with that specific project. It should be appreciated that the customizing table 115 may be generated for different projects in order to test the performance of the enterprise software application 150 operating in accordance to different sets of customizations.

In some example embodiments, generating the virtual customizing table 115 as needed may obviate the need to persist the virtual customizing table 115 at the database 160. Moreover, generating the virtual customizing table 115 on the fly by generating a database view on at least the first database table 210, the second database table 220, and the third database table 230 may obviate the complex recalculations that may be necessitated to a change in the underlying templates. Instead, the changes to the template may be applied by modifying the second database table 220 and/or the third database table 230 such that the changes to the template are captured by the virtual customizing table 115 when the virtual customizing table 115 is generated subsequent to modifying the second database table 220 and/or the third database table 230.

Figure 3:
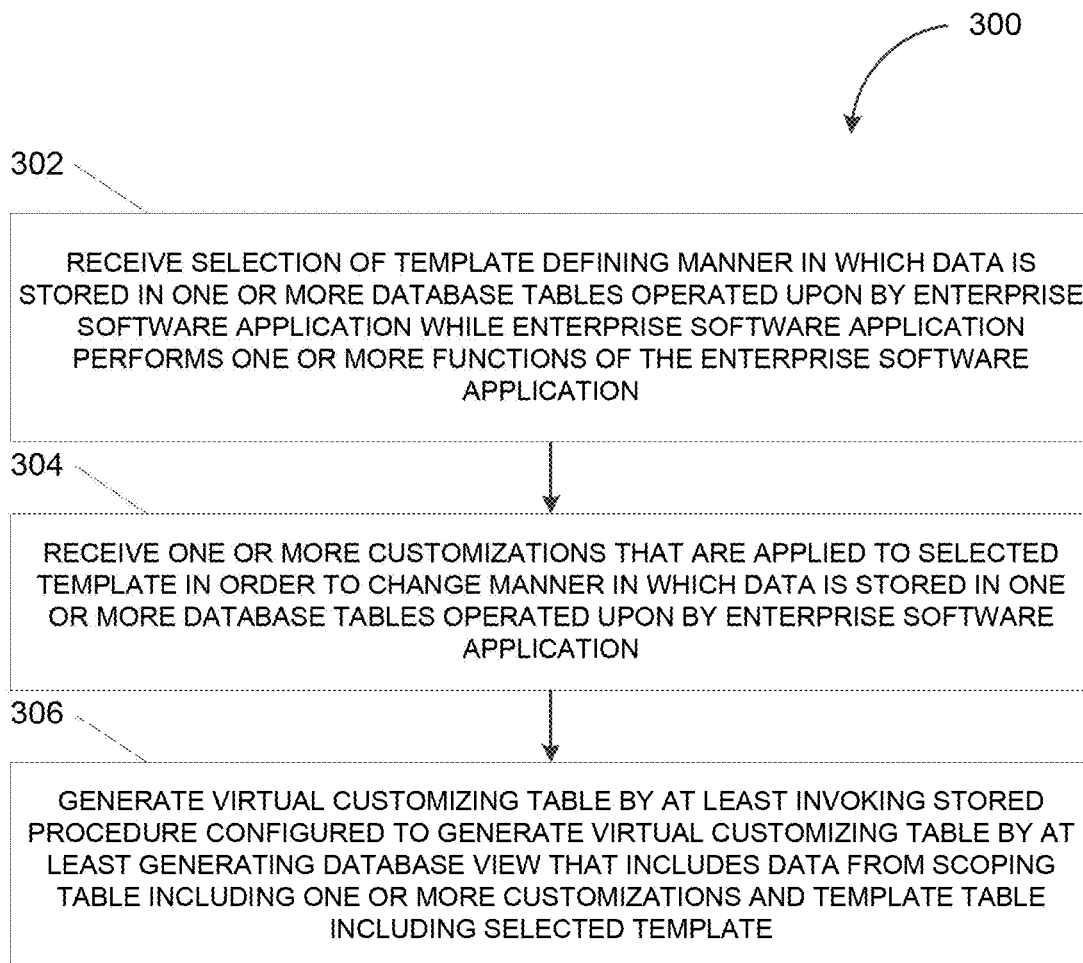
FIG. 3 depicts a flowchart illustrating a process for customizing an enterprise software application, in accordance with some example embodiments.

FIG. 3 depicts a flowchart illustrating a process 300 for customizing an enterprise software application, in accordance with some example embodiments. Referring to FIGS. 1-3, the process 300 may be performed by the configuration engine 110 in order to implement one or more customizations applied to the enterprise software application 150 deployed at the production system 120.

At 302, the configuration engine 110 may receive a selection of a template defining a manner in which data is stored in one or more database tables operated upon by an enterprise software application while the enterprise software application performs one or more functions of the enterprise software application. In some example embodiments, the enterprise software application 150 may perform one or more functions including, for example, invoicing, procurement, payroll, time and attendance management, recruiting and onboarding, learning and development, performance and compensation, workforce planning, and/or the like. In order to perform these functions of the enterprise software application 150, the enterprise software application 150 may operate on data stored in one or more database tables (e.g., at the database 160). As such, the enterprise software application 150 may be associated with one or more templates, each of which defining the manner in which data is stored in the one or more database tables operated upon by the enterprise software application 150 while performing one or more functions of the enterprise software application 150. These templates may be stored in one or more template tables at the database 160 such as, for example, the second database table 220, the third database table 230, and/or the like. As part of scoping the enterprise software application 150, the user 135 at the client 130 may select a template associated with the enterprise software application 150.

At 304, the configuration engine 110 may receive one or more customizations that are applied to the selected template in order to change the manner in which data is stored in the one or more database tables operated upon by an enterprise software application. In some example embodiments, the user 135 at the client 130 may further scope the enterprise software application 150 by applying one or more customizations to the selected template. The selected template may, as noted, define the manner in which data is stored in the one or more database tables operated upon by the enterprise software application 150 while performing one or more functions of the enterprise software application 150. Applying the one or more customizations to the selected template may therefore change the manner in which data is stored in the one or more database tables operated upon by the enterprise software application 150 while performing one or more functions of the enterprise software application 150. As such, the one or more customizations from the user 135 at the client 130 may add, remove, and/or modify one or more functions of the enterprise software application 150. These customizations may be stored at a scoping table at the database 160 such as, for example, the first database table 210 and/or the like.

At 306, the configuration engine 110 may generate a virtual customizing table by at least invoking a stored procedure configured to generate the virtual customizing table by at least generating a database view that includes data from a scoping table including the one or more customizations and a template table including the selected template. In some example embodiments, the configuration engine 110 may generate the virtual customizing table 115 as needed instead of persisting the virtual customizing table 115 at the database 160. The configuration engine 110 may generate the virtual customizing table 115 by at least invoking the stored procedure 165, which may be a subroutine including a set of Structure Query Language (SQL) statements for accessing the database 160.

In some example embodiments, when invoked, the stored procedure 165 may generate the virtual customizing table 115 by creating a database view with data from multiple database tables stored in the database 160. In the example shown in FIG. 2, the stored procedure 165 may generate the virtual customizing table 115 by creating a database view that combines data from the first database table 210 corresponding to a scoping table storing the one or more customizations applied by the user 135 at the client 130 as well as the second database table 220 and the third database table 230 corresponding to template tables storing at least the template selected by the user 135 at the client 130. The stored procedure 165 may be configured to generate the database view by at least performing an inner join that joins together the first database table 210, the second database table 220, and the third database table 230 based on the content block name field, the scope decision field, the content record name field, and the record content field. The resulting virtual customizing table 115 may include fields for scoping item, scope decision, content block name, content record name, record content, record table or view, record entity, field, and field content. The enterprise software application 150 operating based on the virtual customizing table 115 may include the one or more customizations specified by the user 135 at the client 130.

Figure 4:
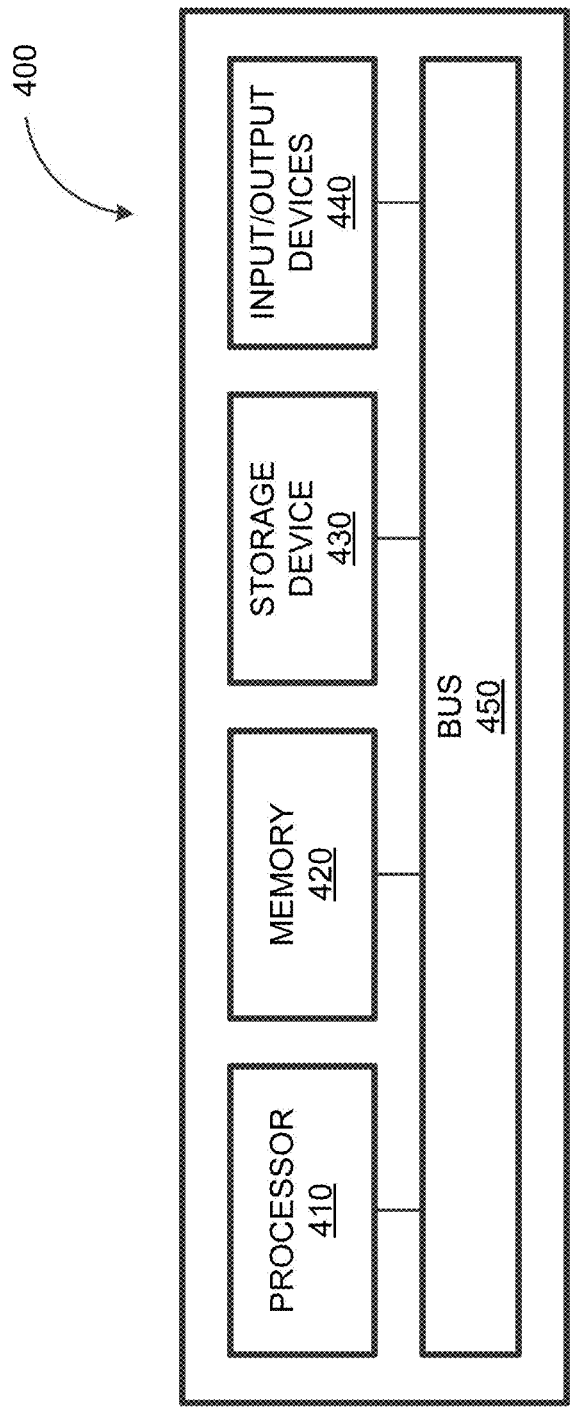
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the configuration engine 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the configuration engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
   at least one data processor; and
   at least one memory storing instructions, which when executed by the at least one data processor, result in operations comprising:
   receiving a selection of a template from a plurality of templates, each of the plurality of templates defining a manner in which data is stored in one or more database tables operated upon by a software application while the software application performs one or more functions of the software application, and the plurality of templates stored in a first database table;
   receiving a first customization to add, remove, and/or modify the one or more functions of the software application, the first customization being implemented by modifying the template to change the manner in which data is stored in the one or more database tables operated upon by the software application;
   storing, in a second database table, the first customization;
   in response to receiving a second customization to add, remove, and/or modify the one or more functionalities of the software application, modifying the second database table;
   generating, in response to the software application performing the one or more functions, a virtual customizing table, the virtual customizing table being generated by performing an inner join that joins, based on a content name field, a scope decision field, and a record content field, the first database table as modified by the first customization and the second database table as modified by the second customization, the virtual customizing table being generated on demand without being persisted at a database such that the virtual customizing table captures one or more changes made to the first database table and to the second database table since a previously generated version of the virtual customizing table; and performing, based at least on the virtual customizing table, the one or more functions of the software application using the virtual customizing table.

2. The system of claim 1, wherein the virtual customizing table is generated by invoking a stored procedure configured to generate a database view.

3. The system of claim 2, wherein the stored procedure comprises a set of Structured Query Language (SQL) statements for accessing a database storing the first database table and the second database table.

4. The system of claim 3, wherein the stored procedure is stored at the database storing the first database table and the second database table.

5. The system of claim 1, wherein each of the plurality of templates specify one or more columns included in each of the one or more database tables operated upon by the software application.

6. The system of claim 1, wherein the software application comprises an enterprise resource planning (ERP) software application, a customer relationship management (CRM) software application, and/or a supply chain management (SCM) software application.

7. The system of claim 1, wherein the one or more functions comprise invoicing, procurement, payroll, time and attendance management, recruiting and onboarding, learning and development, performance and compensation, and/or workforce planning.

8. A computer-implemented method comprising:
receiving a selection of a template from a plurality of templates, each of the plurality of templates defining a manner in which data is stored in one or more database tables operated upon by a software application while the software application performs one or more functions of the software application, and the plurality of templates stored in a first database table;
receiving a first customization to add, remove, and/or modify the one or more functions of the software application, the first customization being implemented by modifying the template to change the manner in which data is stored in the one or more database tables operated upon by the software application;
storing, in a second database table, the first customization;
in response to receiving a second customization to add, remove, and/or modify the one or more functionalities of the software application, modifying the second database table;
generating, in response to the software application performing the one or more functions, a virtual customizing table, the virtual customizing table being generated by performing an inner join that joins, based on a content name field, a scope decision field, and a record content field, the first database table as modified by the first customization and the second database table as modified by the second customization, the virtual customizing table being generated on demand without being persisted at a database such that the virtual customizing table captures one or more changes made to the first database table and to the second database table since a previously generated version of the virtual customizing table; and performing, based at least on the virtual customizing table, the one or more functions of the software application using the virtual customizing table.

9. The method of claim 8, wherein the virtual customizing table is generated by invoking a stored procedure configured to generate a database view.

10. The method of claim 9, wherein the stored procedure comprises a set of Structured Query Language (SQL) statements for accessing a database storing the first database table and the second database table, and wherein the stored procedure is stored at the database storing the first database table and the second database table.

11. The method of claim 8, wherein each of the plurality of templates specify one or more columns included in each of the one or more database tables operated upon by the software application.

12. The method of claim 8, wherein the software application comprises an enterprise resource planning (ERP) software application, a customer relationship management (CRM) software application, and/or a supply chain management (SCM) software application.

13. The method of claim 8, wherein the one or more functions comprise invoicing, procurement, payroll, time and attendance management, recruiting and onboarding, learning and development, performance and compensation, and/or workforce planning.

14. A non-transitory computer readable medium storing instructions, which when executed by at least one data processor, result in operations comprising:
receiving a selection of a template from a plurality of templates, each of the plurality of templates defining a manner in which data is stored in one or more database tables operated upon by a software application while the software application performs one or more functions of the software application, and the plurality of templates stored in a first database table;
receiving a first customization to add, remove, and/or modify the one or more functions of the software application, the first customization being implemented by modifying the template to change the manner in which data is stored in the one or more database tables operated upon by the software application;
storing, in a second database table, the first customization;
in response to receiving a second customization to add, remove, and/or modify the one or more functionalities of the software application, modifying the second database table;
generating, in response to the software application performing the one or more functions, a virtual customizing table, the virtual customizing table being generated by performing an inner join that joins, based on a content name field, a scope decision field, and a record content field the first database table as modified by the first customization and the second database table as modified by the second customization, the virtual customizing table being generated on demand, for software application customization, without being persisted at a database such that the virtual customizing table captures one or more changes made to the first database table and to the second database table since a previously generated version of the virtual customizing table; and
performing, based at least on the virtual customizing table, the one or more functions of the software application using the virtual customizing table.

* * * * *